United States Patent [19]
Nissing et al.

[11] Patent Number: 6,060,149
[45] Date of Patent: May 9, 2000

[54] MULTIPLE LAYER WIPING ARTICLE

[75] Inventors: Nicholas James Nissing, Cincinnati; David Michael McAtee, Mason; David William Cabell, Cincinnati, all of Ohio

[73] Assignee: The Procter & Gamble Company, Cincinnati, Ohio

[21] Appl. No.: 09/013,640

[22] Filed: Jan. 26, 1998

Related U.S. Application Data

[60] Provisional application No. 60/058,773, Sep. 12, 1997.

[51] Int. Cl.[7] .................... B32B 3/24; B32B 3/28
[52] U.S. Cl. ................ 428/138; 428/152; 428/153; 428/154; 428/131; 428/137; 428/213; 428/212; 428/198; 156/291
[58] Field of Search .................. 428/152, 153, 428/154, 131, 138, 137, 213, 212, 198; 156/291

[56] References Cited

U.S. PATENT DOCUMENTS

| | | | |
|---|---|---|---|
| 3,375,156 | 3/1968 | Edgar, Jr. | 162/132 |
| 3,424,643 | 1/1969 | Lewis, Jr. et al. | 161/57 |
| 3,546,056 | 12/1970 | Thomas | 161/57 |
| 3,597,299 | 8/1971 | Thomas et al. | 161/57 |
| 3,615,976 | 10/1971 | Endres et al. | 156/83 |
| 3,650,882 | 3/1972 | Thomas | 161/122 |
| 3,684,641 | 8/1972 | Murphy | 161/129 |
| 3,687,797 | 8/1972 | Wideman | 428/154 |
| 3,695,985 | 10/1972 | Brock et al. | 161/129 |
| 3,708,383 | 1/1973 | Thomas et al. | 161/57 |
| 3,709,750 | 1/1973 | Minshell | 156/72 |
| 3,755,062 | 8/1973 | Schirmer | 161/146 |
| 3,903,342 | 9/1975 | Roberts, Jr. | 428/153 |
| 3,925,127 | 12/1975 | Yoshioka | 156/85 |
| 3,953,638 | 4/1976 | Kemp | 428/154 |
| 4,276,339 | 6/1981 | Stoveken | 428/153 |
| 4,307,141 | 12/1981 | Walbrun | 428/132 |
| 4,469,735 | 9/1984 | Trokhan | 428/154 |
| 4,522,863 | 6/1985 | Keck et al. | 428/196 |
| 4,525,407 | 6/1985 | Ness | 428/138 |
| 4,657,802 | 4/1987 | Morman | 428/152 |
| 4,661,389 | 4/1987 | Mudge et al. | 428/110 |
| 4,847,134 | 7/1989 | Fahrenkrug et al. | 428/138 |
| 4,891,258 | 1/1990 | Fahrenkrug | 428/138 |
| 5,223,096 | 6/1993 | Phan et al. | 162/158 |
| 5,227,228 | 7/1993 | Newell | 428/224 |
| 5,245,025 | 9/1993 | Trokhan et al. | 536/56 |
| 5,277,761 | 1/1994 | Phan et al. | 162/109 |
| 5,401,557 | 3/1995 | Inomata et al. | 428/110 |
| 5,506,030 | 4/1996 | Landers et al. | 428/143 |
| 5,618,610 | 4/1997 | Tomita et al. | 428/152 |
| 5,623,888 | 4/1997 | Zafiroglu | 112/414 |
| 5,635,275 | 6/1997 | Biagioli et al. | 428/132 |
| 5,654,076 | 8/1997 | Trokhan et al. | 428/131 |

FOREIGN PATENT DOCUMENTS

0 616 074  9/1994  European Pat. Off. .

*Primary Examiner*—William P. Watkins, III
*Attorney, Agent, or Firm*—Roddy M Bullock; Larry L. Huston; Jacobus C. Rousser

[57] ABSTRACT

A disposable wiping article is disclosed. The disposable wiping article has at least two layers. The first layer has a wet extensibility greater than that of the second layer. The first layer can be an apertured, dry creped web of cellulosic fibers, and the second layer can be a nonwoven web comprising synthetic fibers. Selected portions of the first layer are bonded to the second layer to inhibit wet extension of the first layer in the plane of the first layer.

25 Claims, 4 Drawing Sheets

MULTIPLE LAYER WIPING ARTICLE

This application claims priority to provisional application Ser. No. 60/058,773, filed Sep. 12, 1997.

FIELD OF THE INVENTION

The present invention is related to disposable wiping articles, and more particularly to disposable wiping articles having a substrate comprising multiple layers.

BACKGROUND OF THE INVENTION

Disposable wiping articles are well known in the art. Such wiping articles typically have a substrate which includes one or more materials or layers. The substrate can be premoistened with a wetting agent prior to use, or alternatively, can be combined with a liquid at the point of use of the article. Pre-moistened wiping articles are also referred to as "wet wipes" and "towelettes."

Desirable features of such wiping articles include texture, caliper (thickness) and bulk (volume per unit weight). A relatively high value of texture is desirable for aiding in cleaning of surfaces. Relatively high values of caliper and bulk are desirable for providing volume in the article for receiving and containing liquids.

One method of imparting texture and bulk to a wiping article is by combining layers of plies having different properties. U.S. Pat. No. 4,469,735 issued Sep. 4, 1984 to Trokhan discloses a multiple ply tissue paper product having a wet microcontracted constraining paper ply and a dry creped constrained paper ply. Portions of the constrained ply are adhered to the constraining ply. When the multiple ply product is wetted, unadhered portions of the constrained ply pucker in the direction to provide texture and bulk. While the structure in U.S. Pat. No. 4,469,735 provides the advantage of texture and bulk upon wetting, the structures in the '735 patent have reported wet calipers (thickness) which are lower than the corresponding dry calipers.

Accordingly, it would be desirable to provide a disposable wiping article which exhibits increased texture and bulk upon wetting.

Additionally, it would be desirable to provide a disposable wiping article having a wet caliper greater than the dry caliper of the article.

Additionally, it would be desirable to provide a disposable wiping article having an apertured paper layer, and which provides increased texture and bulk upon wetting.

Further, it would be desirable to provide a disposable wiping article having increased texture and bulk upon wetting on one side, while maintaining a relatively smooth, soft surface on the other side.

SUMMARY OF THE INVENTION

The present invention provides a multiple layer disposable wiping article. The wiping article includes at least two layers, or plies. The first layer is preferably apertured, and the first layer is extensible when the first layer is wetted. The second layer is less extensible when wetted than the first layer. Selected portions of the first layer are joined to the second layer to inhibit wet extension of the first layer in the plane of the first layer.

When the first layer is wetted, the second layer constrains extension of the first layer in the plane of the first layer. As a result, portions of the first layer deform, such as by buckling or puckering, in the Z-direction (perpendicular to the plane of the first layer.)

The first layer preferably has a wet extensibility of at least about 4 percent, more preferably at least about 10 percent, and still more preferably at least about 20 percent as measured using the "Wet Extensibility Test" provided below. The first layer can be foreshortened, e.g., by creping, to provide the desired wet extensibility. In one embodiment, the first layer comprises a wet laid, apertured paper web which is foreshortened at least about 30 percent by dry creping.

The second layer has a wet extensibility less than that of the first layer. The wet extensibility of the first layer minus the wet extensibility of the second layer is preferably at least about 4 percent, more preferably at least about 10 percent, and still more preferably at least about 20 percent. The second layer can comprise a nonwoven web of natural fibers, synthetic fibers, or combinations thereof In one embodiment, the second layer comprises a hydroentangled nonwoven web of rayon and polyester fibers.

The disposable wiping article can have a wet caliper to dry caliper ratio greater than 1.0, and more preferably at least about 1.1, and even more preferably at least about 1.4, where the wet to dry caliper ratio is a relative measure of the wet and dry thickness of the article. The wet to dry caliper ratio is measured according to the procedure set forth below.

Preferably, selected portions of the first layer are joined to the second layer in a predetermined bonding pattern to provide a plurality of unbonded regions of the first layer. In one embodiment, the first and second layers are bonded together using a hot melt adhesive.

DETAILED DESCRIPTION OF THE INVENTION

Figure 1:
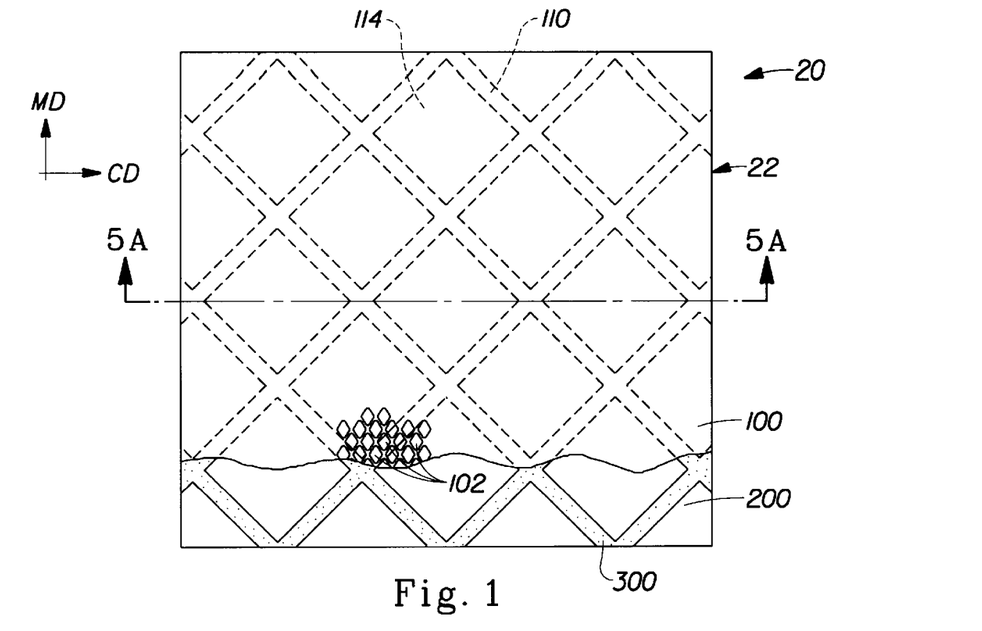
FIG. 1 is a plan view illustration of one embodiment of a wiping article of the present invention, the wiping article including an extensible first layer and a less extensible second layer, with the first layer shown facing the viewer, and with a portion of the first layer shown cut away to show a continuous network of generally parallel sets of intersecting lines of adhesive which serve to bond the first layer to the second layer, the bonded region defining generally diamond-shaped unbonded regions.
Figure 2:
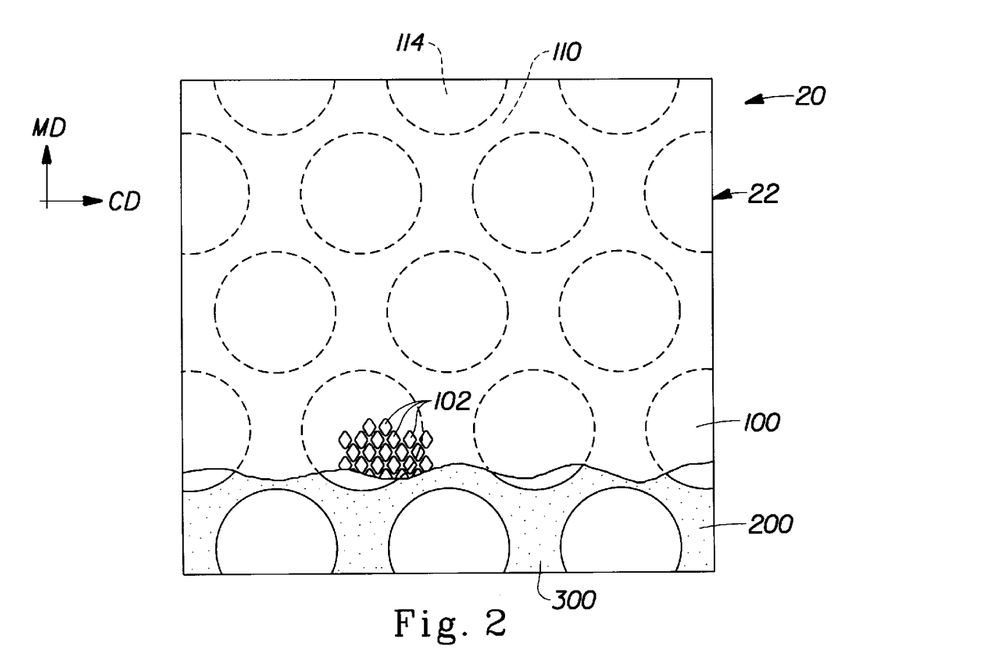
FIG. 2 is an illustration of another embodiment of a wiping article of the present invention, the wiping article including an extensible first layer and a less extensible second layer, with the first layer shown facing the viewer, and with a portion of the first layer shown cut away to show a continuous network of adhesive which serves to bond the first layer to the second layer, the bonded region defining generally circular-shaped unbonded regions.
Figure 3:
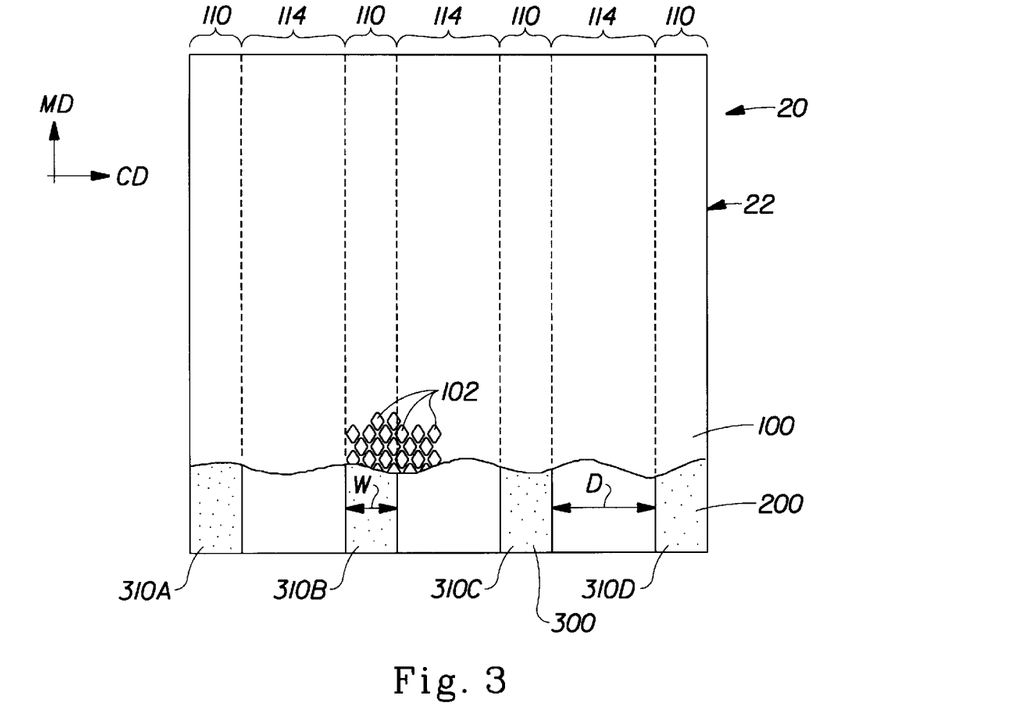
FIG. 3 is a plan view illustration of another embodiment of a wiping article of the present invention, the wiping article including an extensible first layer and a less extensible second layer, with the first layer shown facing the viewer, and with a portion of the apertured layer shown cut away to show generally parallel, spaced apart zones of adhesive extending generally parallel to the machine directions of the apertured layer and the nonwoven layer.

Referring to FIGS. 1–3, the present invention comprises a multiple layer disposable wiping article 20. FIGS. 1–3 illustrate a two layer, or two ply, embodiment of the present invention. Alternatively, the disposable wiping article can include more than two layers.

The disposable wiping article 20 comprises a substrate designated generally by reference numeral 22. The substrate 22 comprises a first layer 100 and a second layer 200. The first layer 100 is extensible, and in particular is extensible when wetted, i.e., the first layer is wet extensible. By "wet extensible" it is meant that a material has a tendency to elongate in at least one direction when wetted. In general, "wetted" refers to wetting with aqueous solutions, including water, capable of inducing extension in the extensible first layer. For example, water relaxes the crepe in foreshortened paper, thereby causing an extension of the paper in at least one direction in the plane of the paper. While not wishing to bound by theory, the relaxation of crepe may be a result of the loss of hydrogen bonds within the paper structure due to the presence of water. However, any fluid, mixture, or solution which could cause this crepe relaxation would be considered to "wet" the article. The second layer 200 is relatively less extensible than the first layer 100, including when wetted. Extensibility is measured according to the "Wet Extensibility Test" described below, and is reported as a percentage.

Selected portions of the first layer 100 are joined, directly or indirectly, to second layer 200 to inhibit wet extension of the first layer in the plane of the first layer. In FIGS. 1 and 2, selected portions of the first layer 100 are joined to the second layer 200 to provide continuous bonded regions designated 110, defining discrete unbonded regions 114. In a preferred embodiment shown in FIG. 1, the bonded regions 110 are shown as a continuous network of intersecting lines forming generally diamond-shaped unbonded regions 114. The width and spacing of the intersecting lines of bonded regions 110 may be adjusted to provide a desired pattern, that is, a desired size and spacing of diamond-shaped unbonded regions 114. As used herein, "continuous network" refers to a macroscopic pattern of the adhesive layer, i.e., the pattern appears to continuous, defining distinct, discrete unbonded regions. The pattern may also be essentially continuous, meaning that the network may be comprised of closely spaced, discrete bond sites, that as a whole form a continuous pattern defining discrete unbonded regions. The continuous network of intersecting lines may be virtually any pattern, resulting in unbonded regions of virtually limitless geometric shapes, including, for example, squares, rectangles, and triangles. As well, the network need not be completely continuous, nor limited to a pattern of straight or uniform lines, but may, for example, be a network resulting in circular, oval, or other non-polygonal geometric shapes. An adhesive, for example, a hot melt adhesive, designated by reference numeral 300 in FIGS. 1–3, can be used to join the first layer 100 to second layer 200.

Alternatively, while a continuous network is currently preferred, it is contemplated that dis-continuous, or essentially continuous, bond pattern may also provide for the desired caliper increase according to present invention. For example, bonded areas comprising open circles or other closed figures may be sufficient to permit unbonded regions to increase in caliper. As in the case of continuous networks, adjacent bond sites, should be less than about one inch from one another, more preferably 0.5 inch, and more preferably less than 0.1 inch. Without wishing to be bound by theory, in principle, the more a particular bond pattern approaches a continuous network, the more pronounced are the benefits of the present invention.

When the first layer is wetted, there is a tendency for the first layer 100 to expand along one or more directions in the plane of the first layer. (The plane of the first layer is parallel to the plane of FIG. 1). However, because of the relatively lower wet extensibility of the second layer 200, the second layer constrains extension of the first layer 100 in the plane of the first layer. As a result, the unbonded regions 114 of the first layer 100 deform, such as by buckling or puckering in the Z-direction, perpendicular to the plane of the first layer 100.

Figure 5A:
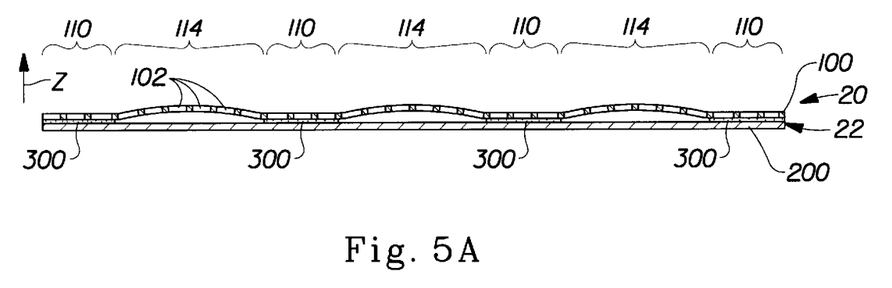
FIG. 5A is a cross-sectional illustration of the wiping article of the present invention taken along the direction indicated by line 5—5 in FIG. 1, and showing the article prior to wetting of the first layer.
Figure 5B:
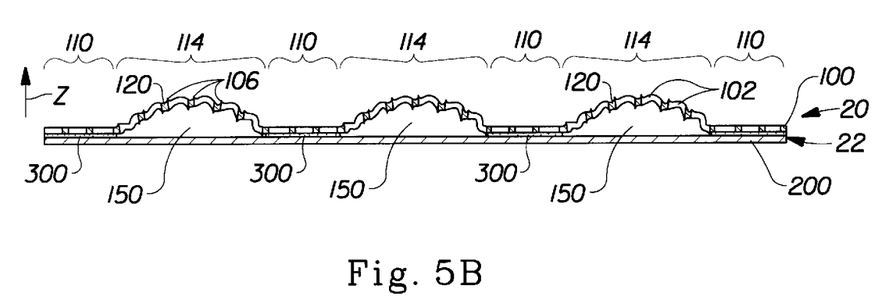
FIG. 5B is a cross-sectional illustration taken along the direction indicated by line 5—5 in FIG. 1, and showing the article after wetting of the first layer.

FIG. 5A is a cross-sectional illustration of the wiping article 20, for example as shown in FIG. 1, prior to wetting of the first layer 100. As shown in FIG. 5A, the wiping article is generally flat prior to wetting. FIG. 5B is cross-sectional illustration similar to that of FIG. 5A, but showing the article 20 after wetting. FIG. 5B shows out-of-plane deformation of the first layer 100 upon wetting of the article 20. The Z-direction is indicated in FIGS. 5A and 5B. The deformation of the wetted first layer 100 provides the article 100 with elevated ridges 120 which increase the wet texture, wet caliper (thickness) and wet bulk of the article 20. The elevated ridges 120 also provide pockets 150 disposed between the unbonded portions of the first layer 100 and the underlying portions of the second layer 200. In particular, the article 20 has a wet caliper to dry caliper ratio which is greater than 1.0, and preferably at least about 1.1, and more preferably at least about 1.4. The wet caliper to dry caliper ratio is a measure of the thickness of the article 20, when wetted, relative to the thickness of the dry article 20 prior to wetting. The wet caliper to dry caliper ratio is measured according to the procedure "Wet Caliper to Dry Caliper Ratio" provided below.

In a preferred embodiment, as shown in FIG. 1, the first layer 100 is apertured, the first layer 100 comprising a plurality of apertures 102 which extend through the thickness of the first layer 100. Apertures, while not necessary to practice the present invention, add greatly to the desired texture and bulk of wiping article 20. In FIGS. 1–3, apertures 102 are shown on only a portion of the first layer 100 for clarity. When an apertured first layer is used, the deformation of the wetted first layer 100 again provides the article 100 with elevated ridges 120 which increase the wet texture, wet caliper (thickness) and wet bulk of the article 20. However, in this embodiment, the elevated ridges 120 have apertures 102 which provide a flow path through which liquids and/or small particles can enter the pockets 150, shown in FIG. 5A.

Additionally, if the article 20 is used with, or includes a lathering agent, such as a surfactant, the apertures 102 can aid in the incorporation of air during the lathering process, thereby improving lather generation. For instance, a portion of the article 20 can be coated with or otherwise treated with a surfactant composition. The article 20 can be wetted with water to activate the surfactant, and the airflow generated through the apertures 102 during use of the article (e.g. washing or wiping) can help to generate lather.

The size and number of the apertures 102 can influence the speed of lather generation and the quality of lather produced. A relatively small number of relatively large apertures 102 will tend to reduce the time required to generate lather, but will yield relatively large lather bubbles with a translucent appearance. On the other hand, a relatively larger number of relatively smaller apertures 102 will tend to reduce bubble size, thereby increasing lather creaminess and opacity, but at the expense of increasing the time required to generate lather. Between about 4 and about 100 apertures per inch will generally provide preferred lather speed and quality.

Another advantage is recognized when first layer 100 is apertured. As shown in FIG. 5B, in addition to the formation of elevated ridges 120, the wet extension of first layer 100 around apertures 102 forms what can best be described as cusps 106, or surface irregularities formed by the apertures 102. Cusps 106 give added texture to the surface of wipe 22 on the side of apertured first surface 100. This added texture may be modified as needed by adjusting the size and spacing of apertures 102.

Also depicted in FIG. 3 is another variation on the configuration of bonded and unbonded regions. In the embodiment shown, the bonded regions 110 are generally parallel, spaced apart regions which extend along substantially the full length of the article 20, and define generally parallel, spaced apart unbonded regions 114 of the first layer 100. In FIG. 3, the unbonded regions 114 extend along substantially the full length of the article 20. An adhesive, designated by reference numeral 300 in FIGS. 1 and 2, can be used to join the first layer 100 to the second layer 200.

In a currently preferred embodiment, a wipe 20 of the present invention comprises an apertured cellulosic paper first layer bonded to a synthetic nonwoven in a continuous network of intersecting lines defining diamond-shaped unbonded regions. This combination of materials and bonding method and pattern provides for a preferred wipe that exhibits increased texture and bulk on one side upon wetting, while maintaining relatively smooth softness on the other side, and has a wet caliper greater than the dry caliper.

In addition to the above description, it has been found that an additional processing step involving heating the substrate after bonding further improves the texture and bulk, as well as the general aesthetic qualities of the wipe. Without being bound by theory, it is believed that the process of heating causes the thermoplastic adhesive to contract, thereby further causing out-of-plane (Z-direction) deformation of the first layer, as well as the second layer. By contracting in the plane of the wipe article, both layers experience a Z-direction increase in caliper, giving increased overall caliper with a pleasing quilted look.

For example, a wipe that has been adhesively bonded with an ethylene vinyl acetate (hereinafter EVA) hot melt adhesive (one suitable adhesive is a hot melt commercially available as H1382-01 from Ato-Findley Adhesives of Wauwatosa, Wis.), may increase in caliper between 10–20% after a post-lamination heat treatment. In this case, a suitable hot melt adhesive is applied and the resulting article is cooled to room temperature. Heat treatment may then be performed, for example, by raising the temperature to about 100 degrees Celsius for 20 seconds is sufficient to initiate contraction of the polymer network. While not wishing to be bound by theory, it is believed that for this process to be effective, the pattern of bonding must be a continuous or essentially continuous network. Discrete bond sites may not sufficiently contract to improve the appearance of the article.

First Layer:

Referring to the components of the article 20 in more detail, suitable materials from which the first layer 100 can be formed include foreshortened (such as by creping) wet-laid paper webs. Other suitable materials can include woven materials, nonwoven materials, foams, battings, and the like.

The first layer 100 should be constructed to have a wet extensibility of at least 4 percent, more preferably at least about 10 percent, and still more preferably at least about 20 percent. In one embodiment, the first layer has a wet extensibility of at least about 25 percent. Preferably, the difference between the wet extensibility of the first layer and the wet extensibility of the second layer (the wet extensibility of the second layer subtracted from the wet extensibility of the first layer) is at least about 4 percent, more preferably at least about 10 percent, and still more preferably at least about 25 percent.

The fibers or filaments of the first layer 100 can be natural (e.g. cellulosic fibers such as wood pulp fibers, cotton linters, and bagasse fibers) or synthetic (e.g., polyolefins, polyamides, or polyesters), or combinations thereof.

Figure 4:
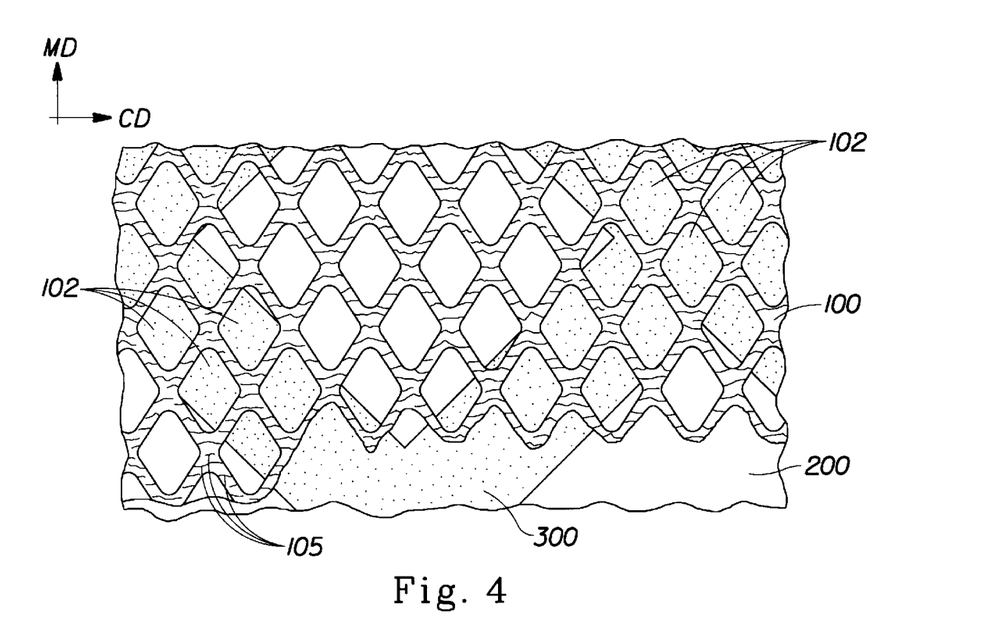
FIG. 4 is an illustration of a portion of the wiping article shown in FIG. 1, FIG. 4 being enlarged relative to FIG. 1 to illustrate the preferred apertures in the extensible first layer and creping ridges in the apertured layer.

In one preferred embodiment, the first layer 100 comprises a wetlaid paper web of cellulosic wood pulp fibers which is foreshortened at least about 4 percent, more preferably at least about 10 percent, and still more preferably at least about 20 percent, by dry creping. Referring to FIG. 4, an apertured first layer 100 is shown comprising crepe ridges 105 corresponding to the foreshortening of the first layer 100. The machine direction (MD) and cross machine direction (CD) are indicated in FIGS. 1–4. The machine direction corresponds to the direction of manufacture of the paper web of first layer 100. The crepe ridges 105 are generally perpendicular to the machine direction, and generally parallel to the cross machine direction of the paper web of first layer 100.

The paper web of the first layer 100 can have a basis weight of between about 15 to about 65 grams per square meter. In a preferred embodiment, the basis weight of the first layer 100 is between about 25 to about 45 grams per square meter, and in a more preferred embodiment, the basis weight is between about 32 to about 35 grams per square meter.

While not wishing to be bound by theory, it is believed that the paper strength can significantly alter the overall appearance of the complete article. The amount of crepe input to the first layer is directly proportional to the amount of planar expansion and thereby the amount of caliper generated upon wetting. However, if the wet strength of the paper article is insufficient, the "buckles" may collapse to form a more "wrinkled" product having less caliper. Therefore both crepe and wet strength can be adjusted to provide an amount of texture based on the intended use of the article. Wet burst measurements were measured by a Thwing-Albert Burst Tester model number 1300-77, which tested peak load of a fully wetted substrate. The test utilized a 0.5 in ball diameter, a 5 in/min ball velocity, and clamps the test sample around a 3.5 in. diameter circle perpendicular to the motion of the ball. Peak load wet burst strengths are between 100 and 1200 grams per ply. More preferably between 400 and 700 grams per ply and most preferably between 500 and 600 grams per ply.

In a more preferred embodiment, first layer 100 comprises an apertured wetlaid paper web of cellulosic wood pulp fibers. Apertures 102 can be formed in the first layer 100 in any suitable manner. For instance, the apertures 102 can be formed in the first layer 100 during formation of the paper web of the first layer 100, or alternatively, after the paper web of the first layer 100 is manufactured. In one embodiment, the paper web of the first layer 100 is produced according to the teachings of one or more of the following U.S. patents, which patents are incorporated herein by reference: U.S. Pat. No. 5,245,025 issued Sep. 14, 1993 to Trokhan et al.; U.S. Pat. No. 5,277,761 issued Jan. 11, 1994 to Phan et al.; and U.S. Pat. No. 5,654,076 issued Aug. 5, 1997 to Trokhan et al. In particular, U.S. Pat. No. 5,277,761 at Column 10 discloses formation of a paper web having a apertures.

Prior to wetting of the first layer, the creped first layer 100 can have between about 4 and about 300 apertures 102 per square inch, and more preferably between about 4 and about 100 apertures 102 per square inch. Wetting a creped paper web causes the web, if unrestrained, to expand in at least one direction, such as the machine direction, so that the number of apertures 102 per square inch after wetting can be smaller than the number of apertures per square inch prior to wetting. Similarly, when apertures are formed in a paper web, and the paper web is subsequently creped, the number of apertures per square inch prior to creping will be smaller than the number of apertures per square inch after creping. Accordingly references to paper web dimensions refer to dimensions after creping and prior to wetting.

The apertures 102 can comprise between about 15 and about 75 percent of the total surface of the first layer 100. The apertures 102 shown in FIG. 4 are bilaterally staggered (staggered in both the machine and cross machine directions) in a repeating, nonrandom pattern. In one embodiment, the first layer 100 comprises a paper web which is dry creped 30 percent (30 percent foreshortening) with greater than about 25 percent wet extensibility, and has about 40 to about 50 apertures 102 per square inch, the apertures 102 having a length 103 (FIG. 4) of about 0.10 to about 0.18 inch and a width 104 of about 0.07 to about 0.15 inch, and a distance between apertures 106 of about 0.05 to about 0.08 inch.

The paper web is manufactured by first forming an aqueous papermaking furnish. The furnish comprises papermaking fibers, and can further comprise various additives. U.S. Pat. No. 5,223,096 issued Jun. 29, 1993 to Phan et al. is incorporated herein by reference for the purpose of disclosing various wood pulps and papermaking additives.

A suitable paper web for making the first layer 100 can be manufactured according to the following description. A papermaking furnish is prepared from water and highly refined Kraft pulp derived from northern softwoods (NSK), the paper furnish having a fiber consistency of about 0.2 percent (dry fiber weight divided by the total weight of the furnish equals 0.002). A dry strength additive such as carboxymethyl cellulose (CMC) is added to the 100% NSK furnish in the amount of about 5 pounds of CMC solids per ton of dry papermaking fibers. A wet strength additive such as Kymene 557H (available from Hercules, Inc. of Wilmington, Del.) is added to the furnish in the amount of about 28 pounds of Kymene solids per ton of dry papermaking fibers.

Figure 6:
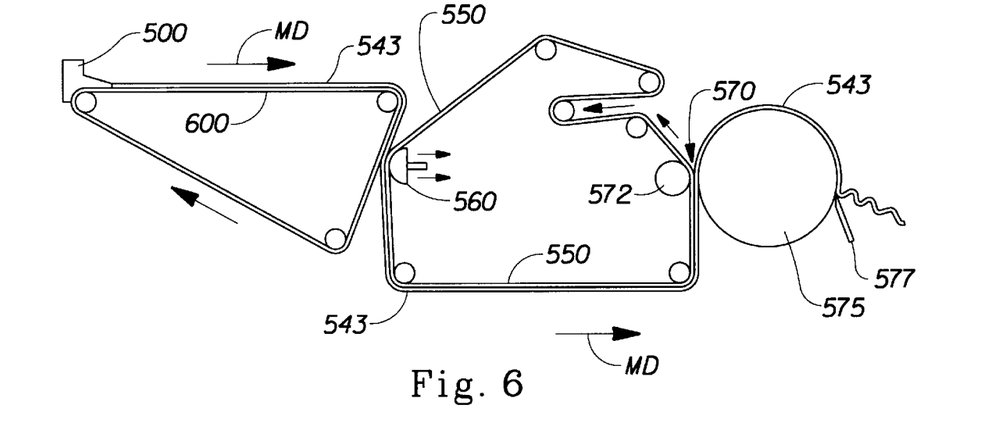
FIG. 6 is an illustration of a paper machine which can be used to make a cellulosic paper web.

Referring to FIG. 6, the furnish is deposited from a headbox 500 of a papermaking machine to a forming element 600 at a fiber consistency of about 0.2 percent. The forming element 600 is in the form of a continuous belt in FIG. 6. The slurry of papermaking fibers is deposited on the forming element 600, and water is drained from the slurry through the forming element 600 to form an embryonic web of papermaking fibers designated by reference numeral 543 in FIG. 6.

Figure 7:
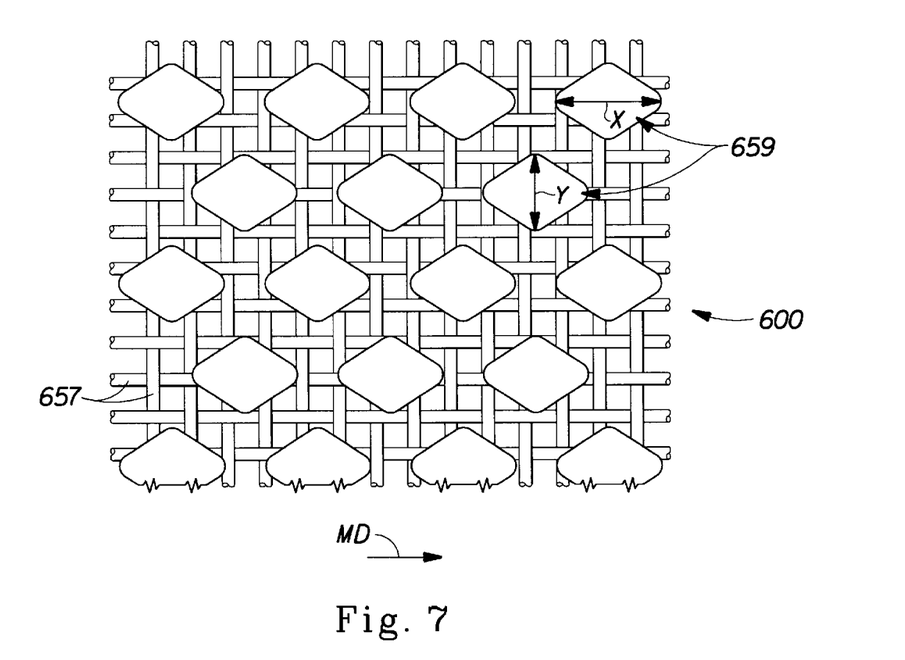
FIG. 7 is an illustration of a forming element which can be used to form a cellulosic paper web with apertures.

FIG. 7 shows a portion of the forming element 600. The forming element 600 has two mutually opposed faces. The face which is shown in FIG. 7 is the face which contacts the papermaking fibers of the web being formed. A description of a forming element of the type shown in FIG. 7 is provided in the above referenced U.S. Pat. Nos. 5,245,025; 5,277,761; and 5,654,076.

The forming element 600 has flow restriction members in the form of protuberances 659. The forming element 600 shown comprises a patterned array of protuberances 659 joined to a reinforcing structure 657, which may comprise a foraminous element, such as a woven screen or other apertured framework. The protuberances 659 extend above the reinforcing structure 657.

A suitable forming element 600 has about 37 protuberances 659 per square inch of surface of the forming element 600, with the protuberances 659 covering about 35 percent of the surface of the forming element 600, as viewed in FIG. 7, and the protuberances extending 0.0255 inches above the surface of the reinforcing structure 657. The protuberances can have a machine direction length X of about 0.1511 inch and a cross machine direction width Y of about 0.0924 inch.

The reinforcing structure 657 is substantially fluid pervious, while the protuberances 659 are substantially fluid impervious. Accordingly, as the liquid in the papermaking furnish drains through the forming element, the papermaking fibers in the furnish will be retained on the reinforcing structure 657, leaving apertures in the embryonic web 543 corresponding generally in size, shape and location to the size, shape and location of the protuberances 659.

Referring back to FIG. 6, the embryonic web 543 is transferred to a conventional dewatering felt 550 with the aid of a vacuum pick up shoe 560. The web 543 is transferred to the felt 550 at a fiber consistency of about 4 percent. The web 543 is carried on the felt 550 to a nip 570 formed between a vacuum pressure roll 572 and a Yankee dryer drum 575. The web 543 is dried on the Yankee drum 575 to a fiber consistency of about 96 percent, at which point the web is creped from the Yankee drum 575 with a doctor blade 577 having a bevel angle of about 25 degrees and an impact angle of about 81 degrees. The web is wound on a reel at a rate (lineal feet per second) which is 25 percent slower than the surface speed of the Yankee drum (reel speed equals 0.75 times the Yankee speed) to foreshorten the web about 25 percent. The foreshortened web can have a basis weight of about 33 grams per square meter, and a thickness of about 12 to 13 mils (0.012 to 0.013 inch) as measured with a confining pressure of 95 grams per square inch and a load foot having a diameter of 2 inches. The resulting foreshortened web can be used to form a first layer 100 having a wet extensibility of at least about 25 percent.

Second Layer:

The first layer 100 is joined to the second layer 200 to constrain extension of selected portions of the first layer 100 when the first layer is wetted. The second layer 200 has a lower wet extensibility than that of the first layer 100.

Suitable materials from which the second layer 200 can be formed include woven materials, nonwoven materials, foams, battings, and the like. Particularly preferred materials are nonwoven webs having fibers or filaments distributed randomly as in "air-laying" or certain "wet-laying" processes, or with a degree of orientation, as in certain "wet-laying" and "carding" processes.

One material from which the second layer 200 can be formed is a nonwoven web formed by hydroentanglement of fibers. A suitable hydroentangled web is a nonwoven, hydroentangled web comprising about 50 percent by weight rayon fibers and about 50 percent by weight polyester fibers, and having a basis weight of about 62 grams per square meter. A suitable hydroentangled nonwoven web is commercially available from PGI Nonwovens of Benson, N.C. under the designation Chicopee 9931.

Bonding:

Selected portions of the first layer 100 are joined directly (or indirectly such as through a third component) to the second layer 200 in a predetermined bonding pattern to provide a plurality of bonded and unbonded regions of the first layer 100. In FIGS. 1–3, the bonded regions are designated 110, and the unbonded regions are designated 114. Each of the first and second layers 100 and 200 can have a machine direction, and the first and second layers can be bonded so that the machine direction of the first layer is generally parallel to the machine direction of the second layer.

The first layer 100 and the second layer 200 can be joined using any suitable method, including but not limited to adhesive bonding, mechanical bonding, thermal bonding, mechanical-thermal bonding, ultrasonic bonding, and combinations thereof In particular, in a preferred embodiment, adhesive is applied by printing methods, such as gravure printing, reverse gravure printing, screen printing, flexographic printing, and the like. In one preferred embodiment, EVA hot melt adhesive may be screen printed in a lattice pattern generally as shown in FIG. 1. A suitable screen printer is a ITW Dynatec Model SP-117. A suitable screen for this printer is a 40 mesh Galvano screen manufactured by Rothtec Engraving Corp., New Bedford, Mass.

The adhesive is preferably water insoluble so that the article 20 can be wetted with water without delamination of the first and second layers. The adhesive is preferably also surfactant tolerant. By "surfactant tolerant" it is meant that the bonding characteristics of the adhesive are not degraded by the presence of surfactants. Suitable adhesives include EVA (ethylene vinyl acetate) based hot melt adhesives. One suitable adhesive is a hot melt adhesive commercially available as H1382-01 from Ato-Findley Adhesives of Wauwatos, Wis.

With reference to FIGS. 1 and 2, the hot melt adhesive can be applied to the nonwoven second layer 200 in a continuous network defining a discontinuous plurality of unbonded regions 114. In one preferred embodiment, as shown in FIG. 1, the adhesive is applied as parallel, spaced apart lines in a first direction, intersected by parallel, spaced apart lines in a second direction. The intersecting lines form diamond-shaped patterns of unbonded regions in the final wipe. In the embodiment shown in FIG. 1, the hot melt adhesive can be applied in lines having a width of about 0.01 inch to about 0.5 inch, preferably about 0.05 to about 0.07 inch. The spacing between adjacent lines of adhesive can be about 0.2 inch to about 2.0, preferably about 0.4 to about 0.6 inches.

In a preferred embodiment, the resulting laminate having a continuous network a plurality of unbonded regions can have an average dry caliper of about 27.80 mils (0.028 inch), an average wet caliper of about 39.39 mils (0.039 inch), and a wet caliper to dry caliper ratio of about 1.42. The dry caliper, wet caliper, and wet caliper to dry caliper ratio are measured as described below under "Wet Caliper to Dry Caliper Ratio."

With reference to FIG. 3, the hot melt adhesive can be applied to the nonwoven second layer 200 in bands which extend generally parallel to the machine direction of the nonwoven second layer 200. The hot melt adhesive can be applied in stripes 310 having a width W (FIG. 3) of about 0.125 inch to about 1 inch. The spacing D between adjacent adhesive stripes can be about 0.125 inch to about 2 inches. In FIG. 3, four stripes 310A, 310B, 310C, and 310D are shown.

When applied as parallel stripes, lines, or bands, the adhesive can be applied to the nonwoven second layer 200 using a slot coating applicator. A suitable slot coating applicator is a Nordson MX series hot melter with extrusion head commercially available from the Nordson Company of Norcross, Ga. The H1382-01 adhesive referenced above can be applied to the second layer 200 at a temperature of about 350 degrees Fahrenheit, at an application level of about 0.03 grams of adhesive per square inch. Immediately following application of the adhesive to the nonwoven second layer 200, the nonwoven second layer 200 and the paper first layer 100 can be bonded together by pressing the two layers 100 and 200 together with the adhesive disposed between the second layer 200 and the first layer 100. One suitable means for pressing the two layers 100 and 200 together is by passing the two layers through a nip formed between two rollers, with the rollers loaded to provide adequate nip pressure for bonding.

In a preferred embodiment the resulting laminate of the first and second layers can have an average dry caliper of about 28.5 mils (0.0285 inch), an average wet caliper of about 32.1 mils (0.0321 inch), and a wet caliper to dry caliper ratio of about 1.1. The dry caliper, wet caliper, and wet caliper to dry caliper ratio are measured as described below under "Wet Caliper to Dry Caliper Ratio."

Wet Extensibility Test:

The wet extensibility of a layer, such as the layer 100 or the layer 200, is determined using the following procedure. Samples are conditioned at 70 degrees Fahrenheit and 50 percent relative humidity for two hours prior to testing.

First, the direction of greatest wet extensibility in the plane of the layer is determined. For dry creped paper webs, this direction will be parallel to the machine direction, and generally perpendicular to the crepe ridges.

If the direction of greatest wet extensibility is not known, the direction can be determined by cutting seven samples from a sheet with sample lengths oriented between 0 degrees and 90 degrees, inclusive, with respect to a reference line drawn on the sheet. The samples are then measured as set forth below to determine the direction of greatest wet extensibility.

Once the direction of the greatest wet extensibility is determined, 8 samples are cut to have a length of about 7 inches measured parallel to the direction of greatest wet extensibility, and a width of at least 1 inch. The samples are cut from unbonded portions of the layers 100 and 200, or, if unbonded portions having the above dimensions cannot be cut from the article 20, then samples are cut from the layers 100 and 200 prior to bonding the layers together. Two marks are placed on each sample, such as with an ink pen. The marks are spaced apart 5 inches as measured parallel to the direction of greatest wet extensibility. This 5 inch length is the initial dry test length of the sample.

Each sample is thoroughly wetted by submerging the sample in distilled water for 30 seconds in a water bath. Each sample is removed from the water bath and immediately supported to hang vertically so that a line through the two marks is generally vertical. The wet sample is supported such that the support does not interfere with extension between the two marks (e.g. with a clip which does not contact the sample between the two marks). The wet test length of the sample is the distance between the two marks. The distance is measured within 30 seconds of removing the sample from the water bath.

For each sample, the percent wet extension is calculated as

Sample Wet Extension=(wet test length−initial dry test length)/(initial dry test length)×100

For example, for a measured wet test length of 6.5 inches and an initial dry test length of 5.0 inches, the wet extension is ((6.5−5)/5)×100=30 percent.

The wet extensibility of the samples is the average of 8 calculated values of sample wet extension.

Wet Caliper to Dry Caliper Ratio:

The wet caliper to dry caliper ratio is measured using a Thwing-Albert Instrument Co. Electronic Thickness Tester Model II, using the following procedure.

Samples are conditioned at 70 degrees Fahrenheit and 50 percent relative humidity for two hours prior to testing.

The dry caliper of the article 20 is measured using a confining pressure of 95 grams per square inch and a load foot having a diameter of 2 inches. The dry caliper is measured for eight samples. For each sample, the caliper is measured with the load foot centered on an unbonded region of the first layer 100. The eight caliper measurements are averaged to provide an average dry caliper.

Each sample is then wetted by submerging the sample in a distilled water bath for 30 seconds. The sample is then removed from the water bath and drained by hanging vertically for about five seconds. The caliper of the wet sample is measured within 30 seconds of removing the sample from the bath. The wet caliper is measured in the same location in which the dry caliper was previously measured. The eight wet caliper measurements are averaged to provide an average wet caliper. The wet caliper to dry caliper ratio is the average wet caliper divided by the average dry caliper.

What is claimed is:

1. A multiple layer disposable wiping article comprising:
   an apertured first layer, the first layer being extensible in the plane of the first layer when the first layer is wetted; and
   a second layer, the second layer being less extensible when wetted than the first layer;
   wherein selected portions of the first layer are joined to the second layer to inhibit wet extension of the first layer in the plane of the first layer, such that said wiping article exhibits a wet caliper to dry caliper ratio greater than about 1.0, and further wherein cusps are formed around the apertures of said first apertured layer when said first apertured layer is wetted.

2. The article of claim 1, wherein the first layer has a wet extensibility of at least 4 percent.

3. The article of claim 1, wherein the first layer has a wet extensibility of at least about 10 percent.

4. The article of claim 1, wherein the first layer has a wet extensibility of at least about 20 percent.

5. The article of claim 1, wherein the first layer has a wet extensibility of at least about 25 percent.

6. The article of claim 1, wherein the difference between the wet extensibility of the first layer and the wet extensibility of the second layer is at least about 4 percent.

7. The article of claim 1, wherein the difference between the wet extensibility of the first layer and the wet extensibility of the second layer is at least about 10 percent.

8. The article of claim 1, wherein the difference between the wet extensibility of the first layer and the wet extensibility of the second layer is at least about 25 percent.

9. The article of claim 1, wherein the first layer comprises a creped paper web.

10. The article of claim 1, wherein the second layer comprises a nonwoven web.

11. The article of claim 1, wherein selected portions of the first layer are adhesively bonded to the second layer to provide a plurality of spaced apart bonded regions and a plurality of spaced apart unbonded regions.

12. The article of claim 1, wherein selected portions of the first layer are adhesively bonded to the second layer to provide a continuous network bonded region defining a plurality of discrete unbonded regions.

13. The article of claim 1, having a wet caliper to dry caliper ratio greater than about 1.4.

14. The article of claim 1, further comprising a lathering agent.

15. A multiple layer disposable wiping article comprising:
   an apertured cellulosic first layer, the first layer being extensible in the plane of the first layer when the first layer is wetted; and
   a synthetic nonwoven second layer, the second layer being less extensible when wetted than the first layer;
   wherein selected portions of the first layer are joined to the second layer to inhibit wet extension of the first layer in the plane of the first layer, and further wherein cusps are formed around the apertures of said first apertured layer when said first apertured layer is wetted.

16. The article of claim 15 wherein the first layer has a wet extensibility of at least 4 percent.

17. The article of claim 15 wherein the first layer has a wet extensibility of at least about 10 percent.

18. The article of claim 15 wherein the first layer has a wet extensibility of at least about 20 percent.

19. The article of claim 15, wherein the first layer has a wet extensibility of at least about 25 percent.

20. The article of claim 15, wherein the first layer comprises a creped paper web.

21. The article of claim 15, wherein selected portions of the first layer are adhesively bonded to the second layer to provide a plurality of spaced apart bonded regions and a plurality of spaced apart unbonded regions.

22. The article of claim 15, wherein selected portions of the first layer are adhesively bonded to the second layer to provide a continuous network bonded region defining a plurality of discrete unbonded regions.

23. The article of claim 15, having a wet caliper to dry caliper ratio greater than about 1.0.

24. The article of claim 15, having a wet caliper to dry caliper ratio greater than about 1.4.

25. The article of claim 15, further comprising a lathering agent.

* * * * *